US011344141B1

(12) United States Patent
Messina

(10) Patent No.: US 11,344,141 B1
(45) Date of Patent: May 31, 2022

(54) VEHICLE WHEEL BUFFING STAND

(71) Applicant: James Messina, Villa Park, IL (US)

(72) Inventor: James Messina, Villa Park, IL (US)

( * ) Notice: Subject to any disclaimer, the term of this patent is extended or adjusted under 35 U.S.C. 154(b) by 61 days.

(21) Appl. No.: 16/569,186

(22) Filed: Sep. 12, 2019

Related U.S. Application Data

(60) Provisional application No. 62/882,845, filed on Aug. 5, 2019.

(51) Int. Cl.
| | |
|---|---|
| *A47F 7/04* | (2006.01) |
| *B60B 30/02* | (2006.01) |
| *B29D 30/06* | (2006.01) |
| *G01M 17/02* | (2006.01) |
| *G01M 1/34* | (2006.01) |
| *G01M 1/04* | (2006.01) |

(52) U.S. Cl.
CPC ............ *A47F 7/04* (2013.01); *B29D 30/0633* (2013.01); *B60B 30/02* (2013.01); *G01M 1/045* (2013.01); *G01M 1/34* (2013.01); *G01M 17/024* (2013.01); *B29D 2030/0638* (2013.01)

(58) Field of Classification Search
CPC ........... A47F 7/04; B60B 30/02; B60B 30/06; B60B 30/08; B60S 3/042; B29D 30/0633; B29D 2030/0635; B29D 2030/063; G01M 17/024; G01M 1/045; G01M 1/34
See application file for complete search history.

(56) References Cited

U.S. PATENT DOCUMENTS

| | | | | | |
|---|---|---|---|---|---|
| 1,412,732 | A | * | 4/1922 | Young ..................... | B60S 3/042 15/53.4 |
| 1,902,611 | A | * | 3/1933 | Blackman .............. | B65H 49/24 242/561 |
| 2,698,099 | A | * | 12/1954 | Durnal ................ | B29B 17/0206 414/433 |
| 3,108,299 | A | * | 10/1963 | Baldwin ................. | B60S 3/042 15/21.1 |
| 3,843,000 | A | * | 10/1974 | Bennett ................. | B05C 13/025 414/433 |
| 3,993,115 | A | * | 11/1976 | Greene ................... | B24B 5/366 157/13 |
| 4,026,546 | A | * | 5/1977 | Omori .................... | A63B 69/16 482/61 |

(Continued)

*Primary Examiner* — Ko H Chan
(74) *Attorney, Agent, or Firm* — Schacht Law Office, Inc.; Paul J. Nykaza

(57) ABSTRACT

A vehicle wheel buffing stand has a first side support frame and a second side support frame spaced from the first side support frame. A first roller extends between the first side support frame and the second side support frame and the first roller is operably connected to the first side support frame and the second side support frame. A second roller extends between the first side support frame and the second side support frame, and the second roller is operably connected to the first side support frame and the second side support frame. The second roller is spaced from the first roller. The stand is configured to receive a vehicle wheel wherein the first roller and the second roller are configured to engage the vehicle wheel and rotatably support the vehicle wheel wherein an operator can rotate the vehicle wheel via rotation of the first roller and the second roller and to prepare surfaces of the vehicle wheel in preparation for mounting a tire on the vehicle wheel.

24 Claims, 12 Drawing Sheets

(56) References Cited

U.S. PATENT DOCUMENTS

| | | | | |
|---|---|---|---|---|
| 4,115,172 | A | * | 9/1978 | Baboff .................. B29C 73/166 |
| | | | | 118/202 |
| 4,244,416 | A | * | 1/1981 | Newton ............. B29D 30/0633 |
| | | | | 157/13 |
| 4,532,665 | A | | 8/1985 | Evans et al. |
| 4,739,724 | A | * | 4/1988 | Giordano ............. B29C 73/166 |
| | | | | 118/320 |
| 4,852,230 | A | | 8/1989 | Yu |
| 4,979,536 | A | * | 12/1990 | Midkiff .................. B60S 3/042 |
| | | | | 134/123 |
| 5,069,348 | A | * | 12/1991 | Long ......................... A47F 7/04 |
| | | | | 211/24 |
| 5,161,281 | A | | 11/1992 | Hanen |
| 5,582,286 | A | | 12/1996 | Kalm et al. |
| D428,221 | S | * | 7/2000 | Johnson ........................... D32/4 |
| 6,672,122 | B2 | | 1/2004 | Mustread et al. |
| 10,933,549 | B2 | * | 3/2021 | Taylor .................. G01M 1/326 |

\* cited by examiner

VEHICLE WHEEL BUFFING STAND

CROSS-REFERENCE TO RELATED APPLICATIONS

The present application claims the benefit of U.S. Patent Application No. 62/882,845, filed on Aug. 5, 2019, which application is incorporated by reference in its entirety herein.

FEDERALLY SPONSORED RESEARCH OR DEVELOPMENT

None.

TECHNICAL FIELD

The invention relates generally to a vehicle wheel buffing stand and, in particular, a vehicle wheel buffing stand that provides for efficient preparation of wheel surfaces prior to having a tire mounted thereon.

BACKGROUND OF THE INVENTION

Wheel/tire assemblies are typically part of any vehicle that conveys people or material over land. A tire is mounted on a wheel, wherein the wheel/tire is then connected to a vehicle chassis, often via an axle. The wheel is typically made from metal material such as steel, alloy or carbon fiber. The tire is a round casing, usually filled with air, that is mounted on the wheel. Tires are typically made from a mixture of rubber, nylon and fiberglass. Tires make contact with a road surface while the wheels do not. Thus, while wheels usually do not wear down, tires wear out over time requiring tires to be replaced.

When a new tire is mounted on a new wheel for the first time, or when a replacement tire is mounted on an existing wheel, the wheel must be prepared or "buffed" prior to mounting the tire on the wheel. Preparing or buffing the wheel includes, among other things, preparing the wheel surfaces, including annular surfaces, that will engage portions of the tire wherein such wheel surfaces are grinded, sanded or polished to remove oxidation (such that may develop on wheel from road salts or from other elements in certain geographic areas), undulations, imperfections or other deposits on the wheel. The entire wheel surfaces of the wheel that operably connect with the tire must be clean. Cleaning such surfaces, however, can be difficult and cumbersome because the wheels are heavy objects that are often difficult to maneuver by hand and the annular shape of the surfaces adds a further level of difficulty. Wheels are typically prepared by an operator manipulating the wheel on a workbench or a garage floor. Such work surfaces themselves are often unclean which further contributes to the challenges in preparing the wheel. If the pertinent wheel surfaces are not prepared and cleaned adequately, the tire/wheel will have lesser performance or experience premature failure.

While such systems and methods for preparing a vehicle wheel for having a tire mounted thereon according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a vehicle wheel buffing stand for preparing a vehicle wheel to have a tire mounted thereon. The vehicle wheel buffing stand allows an operator to efficiently prepare wheel surfaces prior to having the tire mounted thereon.

According to a first aspect of the invention, the vehicle wheel buffing stand has a first side support frame and a second side support frame spaced from the first side support frame. The stand also has a first roller extending between the first side support frame and the second side support frame, the first roller being operably connected to the first side support frame and the second side support frame. The stand also has a second roller extending between the first side support frame and the second side support frame, the second roller being operably connected to the first side support frame and the second side support frame. The second roller is spaced from the first roller. The stand is configured to receive a vehicle wheel wherein the first roller and the second roller are configured to engage the vehicle wheel and rotatably support the vehicle wheel wherein an operator can rotate the vehicle wheel via rotation of the first roller and the second roller and to prepare surfaces of the vehicle wheel in preparation for mounting a tire on the vehicle wheel.

According to another aspect of the invention, the first side support frame has at least three notches and the second side support frame has at least three notches wherein the first roller has opposite ends that fit in a first set of aligned notches of the first side support frame and the second side support frame, the second roller having opposite ends that fit in a second set of aligned notches of the first side support frame and the second side support frame, the space between the first roller and the second roller being adjustable based on the sets of aligned notches where the first roller and the second roller are positioned. According to a further aspect of the invention, the first side support frame has five notches spaced along the first side support frame and the second side support frame has five notches spaced along the second side support frame.

According to a further aspect of the invention, the stand has a second roller assembly having a first pair of spaced, lateral rollers supported along the first side support frame. In a further aspect, the second roller assembly has a second pair of spaced, lateral rollers supported along the second side support frame.

According to another aspect of the invention, in response to rotation of the vehicle wheel on the first roller and second roller and lateral movement of the vehicle wheel along the first roller and the second roller, the first pair of spaced, lateral rollers are configured to engage the vehicle wheel wherein one roller of the first pair of lateral rollers rotates in a direction opposite to an other roller of the first pair of lateral rollers. In a further aspect, in response to rotation of the vehicle wheel on the first roller and second roller and lateral movement of the vehicle wheel along the first roller and the second roller, the second pair of spaced, lateral rollers are configured to engage the vehicle wheel wherein one roller of the second pair of lateral rollers rotates in a direction opposite to an other roller of the second pair of lateral rollers.

According to another aspect of the invention, the first roller and the second roller extend generally transverse or perpendicular to the first pair of spaced, lateral rollers. The first roller and the second roller also extend generally transverse or perpendicular to the second pair of spaced, lateral rollers.

According to a further aspect of the invention, the first pair of lateral rollers are spaced at a central segment of the first side support frame, and the second pair of lateral rollers are spaced at a central segment of the second side support frame.

According to another aspect of the invention, the first roller has a roller member surrounding internal bearing members and post members at opposite ends of the roller member wherein the post members engage the first side support frame and the second side support frame.

According to another aspect of the invention, the first side support frame has two vertical legs connected by a lower side beam and an upper side beam, the lower side beam having at least five notches. The notches are spaced along the lower side beam. The second side support frame has two vertical legs connected by a lower side beam and an upper side beam, the lower side beam having at least five notches. The notches are spaced along the lower side beam. A first cross-beam is connected between the first side support frame and the second side support frame and at first ends of the first side support frame and the second side support frame. A second cross-beam is connected between the first side support frame and the second side support frame and at second ends of the first side support frame and second side support frame.

According to a further aspect of the invention, the first roller has opposite ends that fit in a first set of aligned notches of the first side support frame and the second side support frame, and the second roller has opposite ends that fit in a second set of aligned notches of the first side support frame and the second side support frame. The stand also has a first pair of spaced, lateral rollers supported along the upper side beam of the first side support frame. The stand further has a second pair of spaced, lateral rollers supported along the upper side beam of the second side support frame.

According to another aspect of the invention, the five notches on the first side support frame includes a first central notch positioned proximate a midpoint of a length of the first side support frame and further includes two notches on each side of the first central notch and spaced along the first side support frame. The five notches on the second side support frame includes a second central notch positioned proximate a midpoint of a length of the second side support frame and further includes two notches on each side of the second central notch and spaced along the second side support frame.

According to another aspect of the invention, the first cross-beam and second cross-beam are generally aligned with the lower side beam of the first side support frame and the lower side beam of the second side support frame.

According to a further aspect of the invention, the space between respective inner surfaces of the first side support frame and the second side support frame defines a work area wherein the first spaced pair of lateral rollers are positioned within the work area.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENTS

Figure 1:
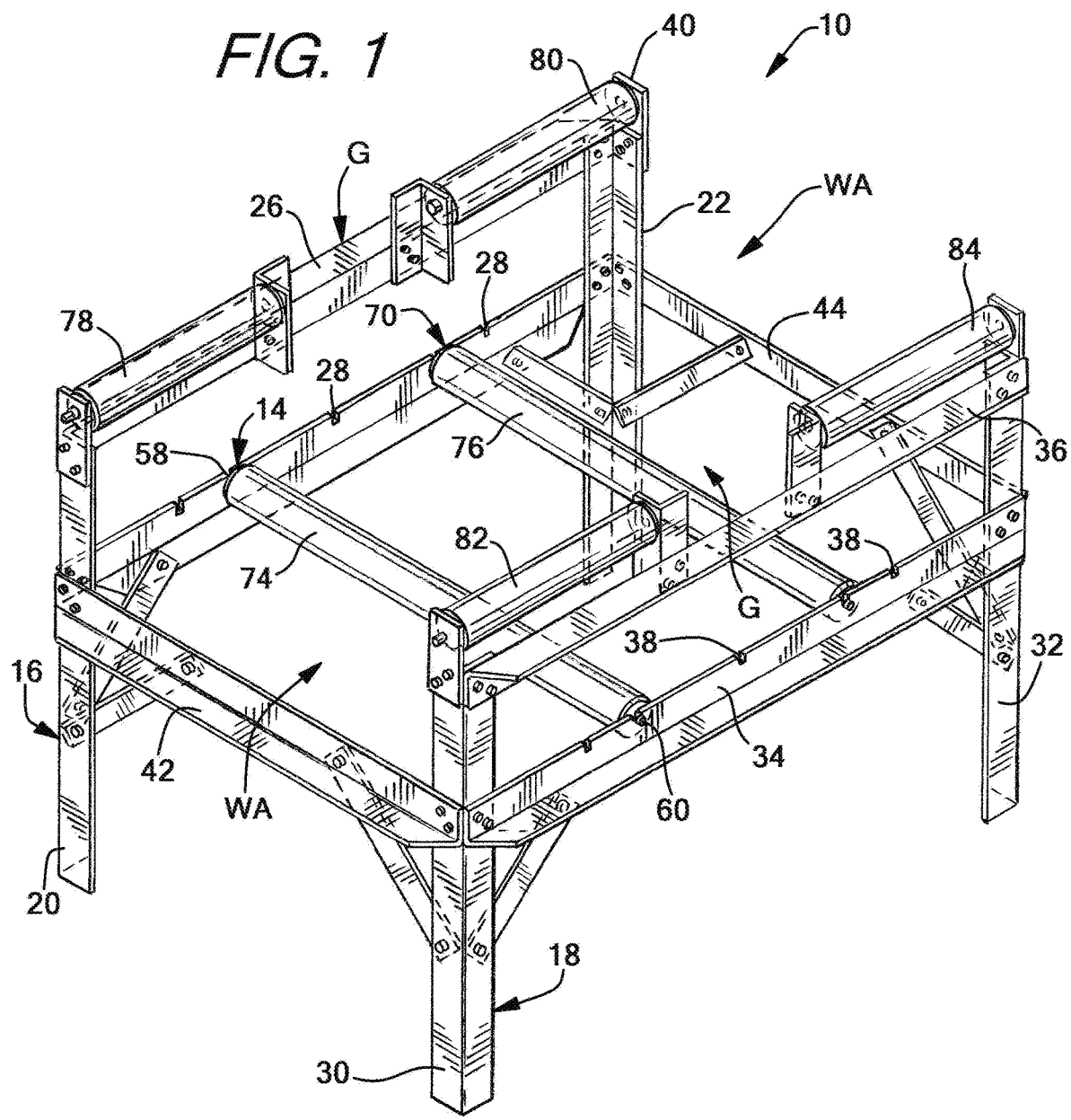
FIG. 1 is a perspective view of a vehicle wheel buffing stand according to an exemplary embodiment of the present invention.
Figure 2:
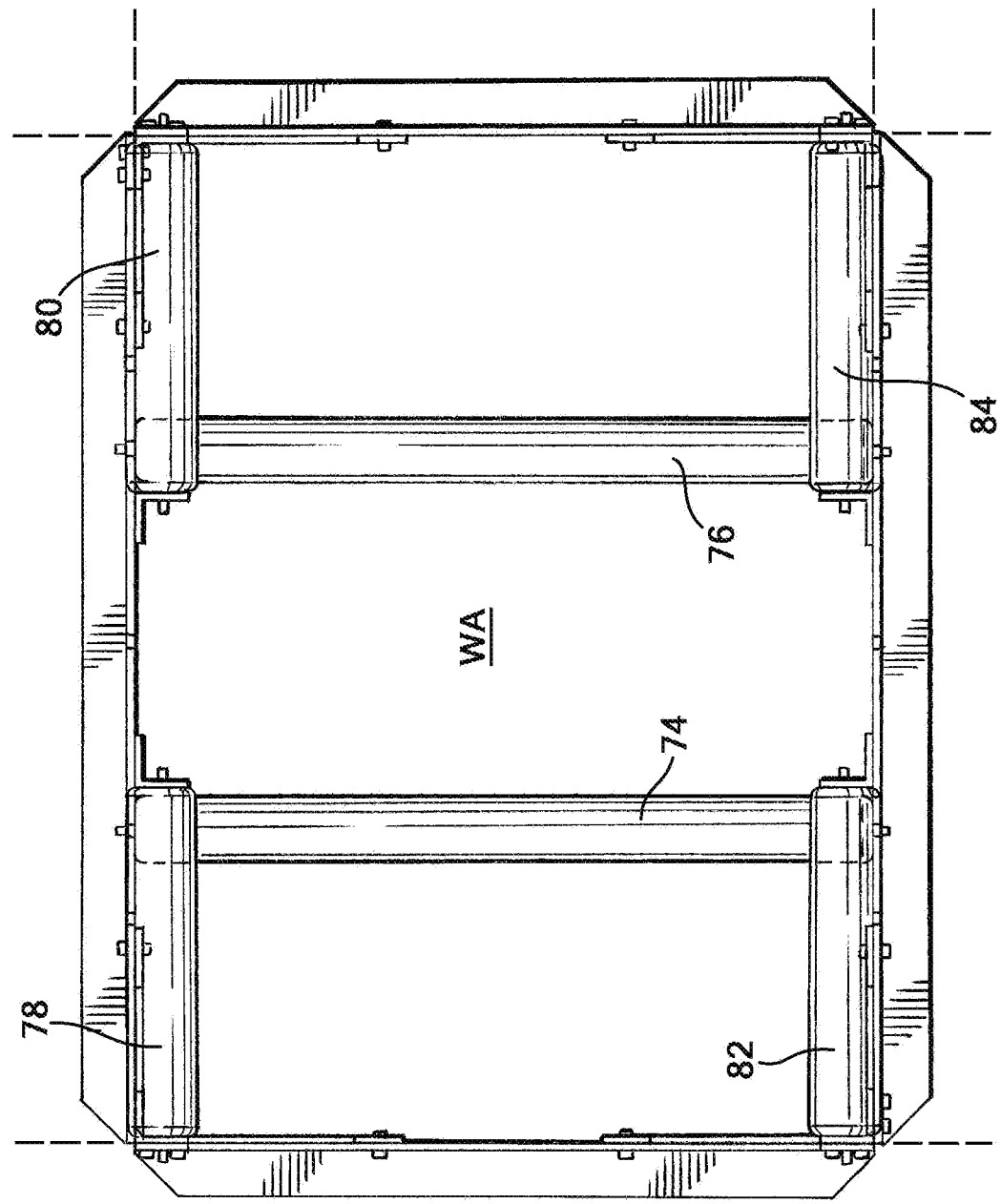
FIG. 2 is a top plan view of the vehicle wheel buffing stand of FIG. 1.
Figure 3:
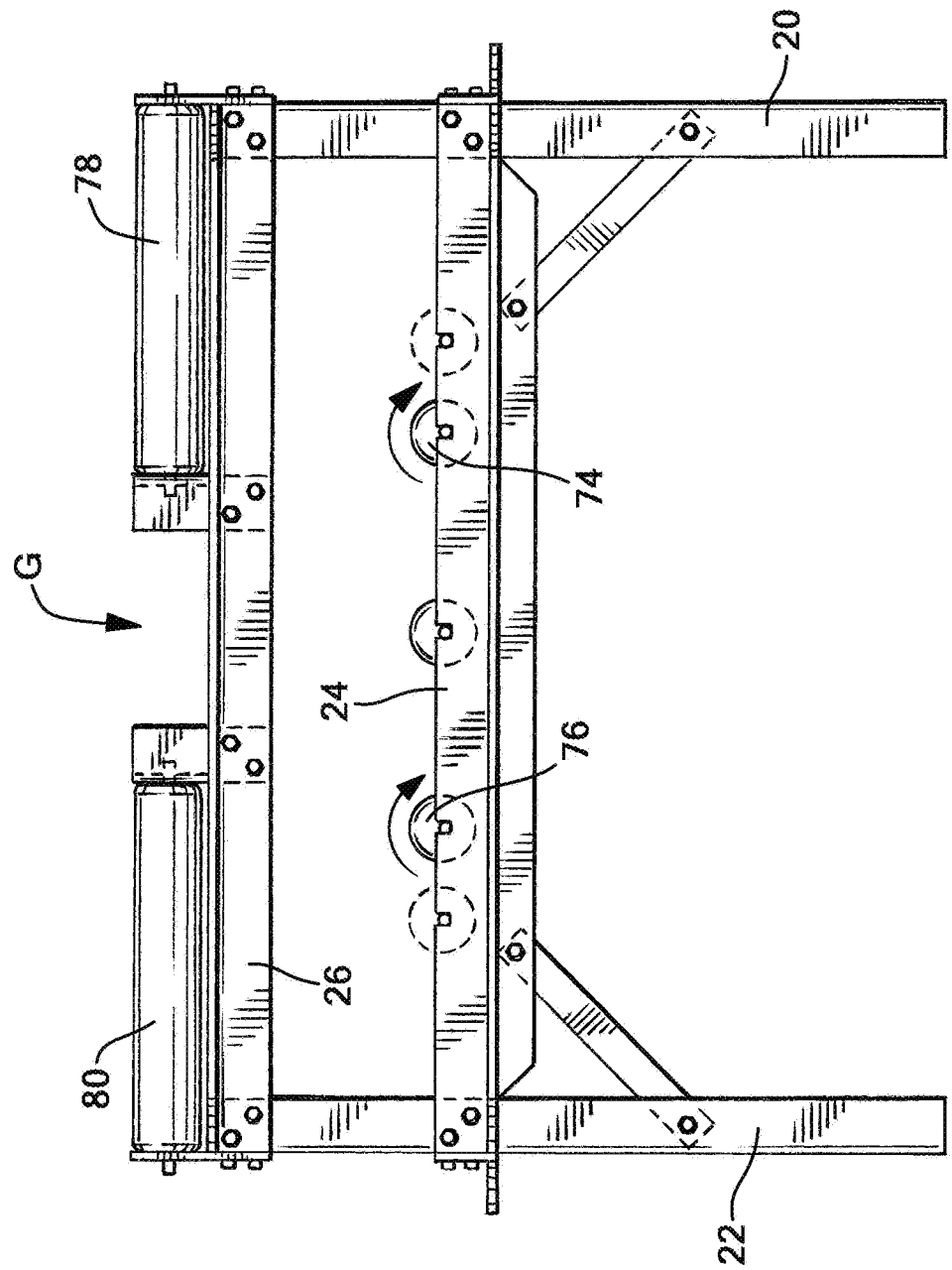
FIG. 3 is a side elevation view of the vehicle wheel buffing stand of FIG. 1.
Figure 4:
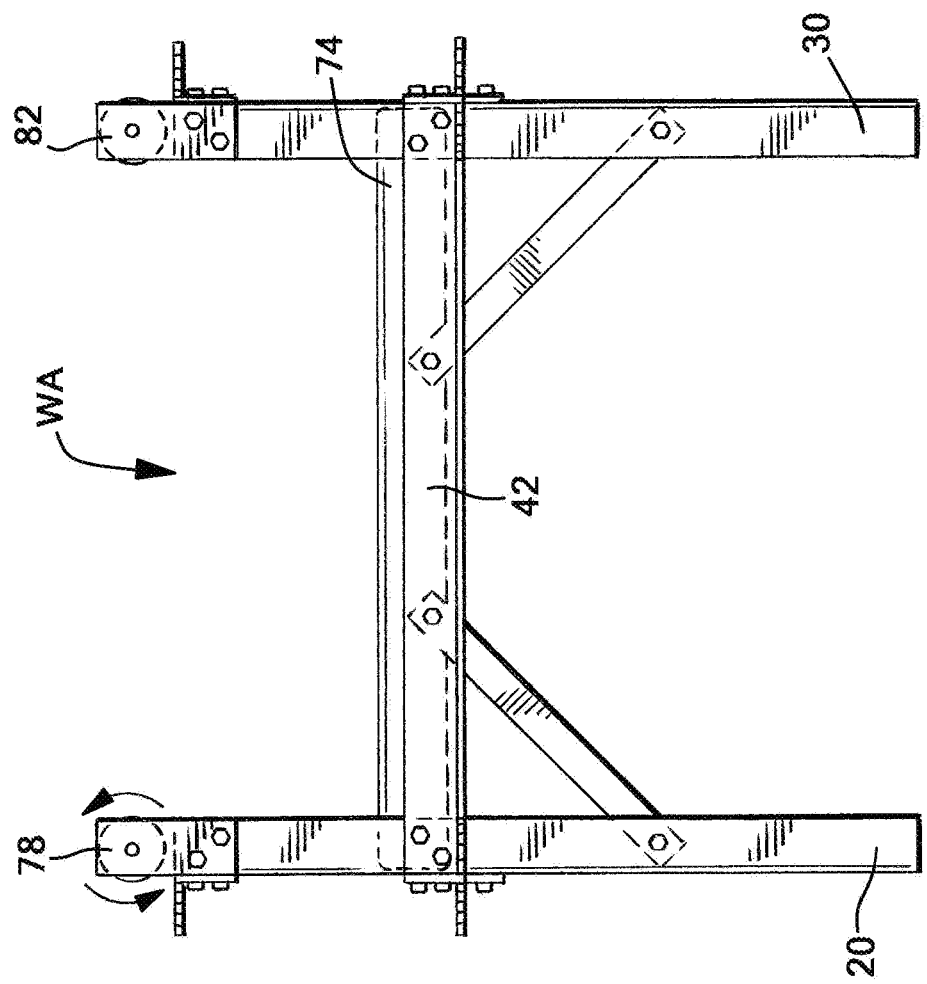
FIG. 4 is an end view of the vehicle wheel buffing stand of FIG. 1
Figure 5:
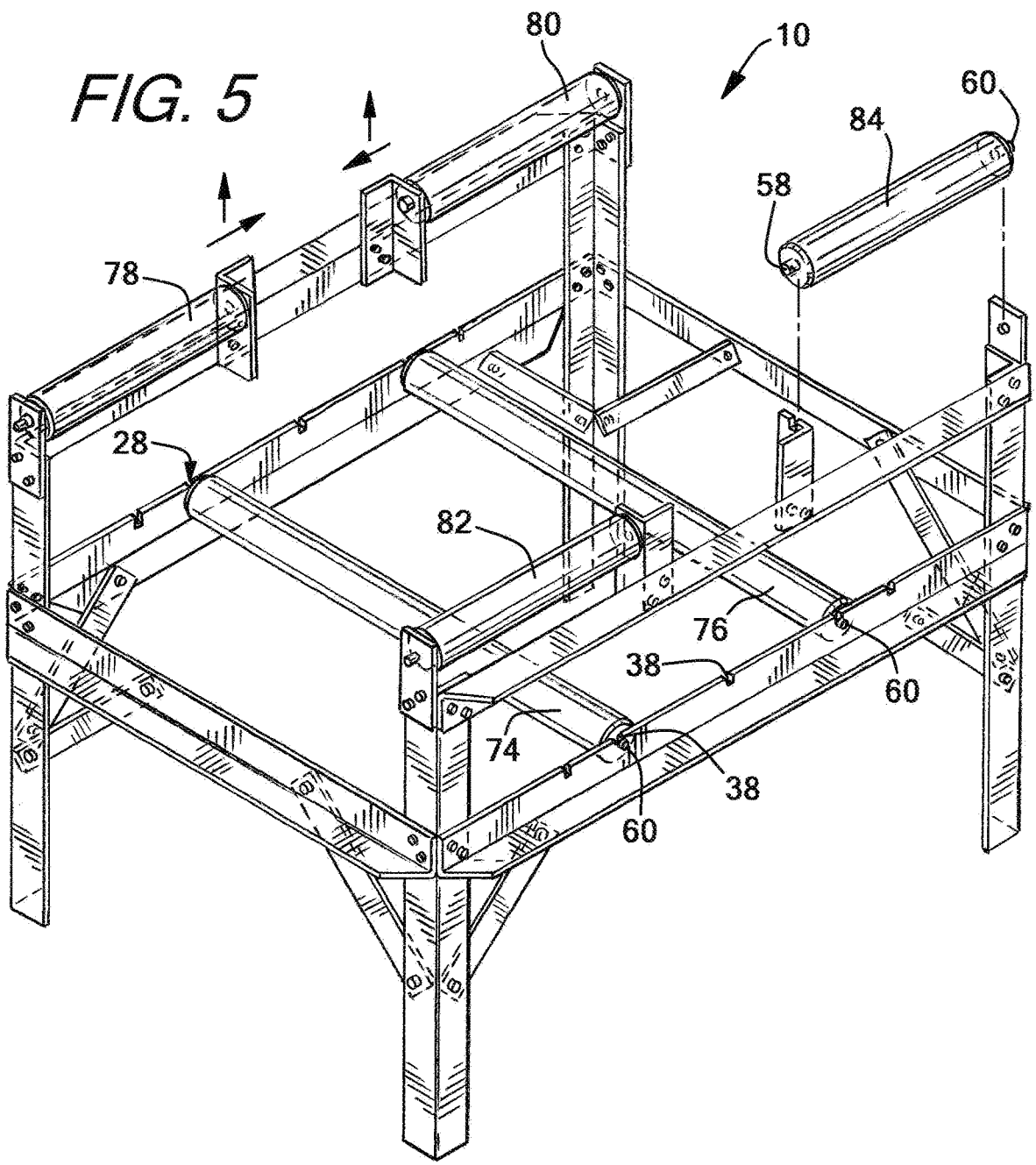
FIG. 5 is a perspective view of the vehicle wheel buffing stand of FIG. 1 showing a roller separated from the stand.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 shows a vehicle wheel buffing stand used to prepare surfaces of a vehicle wheel in preparation for mounting a tire thereon. The structure of the vehicle wheel buffing stand will be described followed by a description of operation of the buffing stand. The vehicle wheel buffing stand is shown in FIG. 1 and is designated with the reference numeral 10. The vehicle wheel buffing stand 10 generally includes a frame assembly 12 and a roller assembly 14. The roller assembly 14 is supported by the frame assembly 12 wherein the roller assembly 14 rotatably supports a vehicle wheel where an operator rotates the vehicle wheel on the stand while preparing surfaces of the vehicle wheel in preparation for mounting a tire thereon.

FIGS. 1-5 further show the frame assembly 12. As discussed, the frame assembly 12 supports the roller assembly 14 and further provides support to the vehicle wheel as will be described herein. The frame assembly 12 generally includes a first side support frame 16 and a second side support frame 18. The first side support frame 16 has two vertical legs 20,22. The vertical legs 20,22 may be considered a first vertical leg 20 and a second vertical leg 22 of the first side support frame 16. The vertical legs 20,22 are connected by a lower side beam 24. The lower side beam 24 is connected to the vertical legs 20,22 at proximate a vertical midpoint of the height of the vertical legs 20,22. The vertical legs 20 are also connected by an upper side beam 26 proximate a vertical top of the vertical legs 20,22. The lower side beam 24 has a plurality notches 28 spaced and extending along the length of the lower side beam 28. The notches 28 are open at a top surface of the lower side beam 24 to receive the post of a roller to be described. In one exemplary embodiment, the plurality of notches 28 includes at least three notches 28 and in a further exemplary embodiment, there are five notches 28. It is understood that the number of notches 28 can vary. As shown in FIG. 1, a centrally-located notch 28, or first central notch 28, is positioned proximate a midpoint of the length of the lower side beam 24. There are two notches 28 spaced apart on each side of the first central notch 28. The lower side beam 24 and notches 28 will operably support portions of the roller assembly 14 as further described herein. As will be further described below, the lower side beam 24 is connected to vertical legs 20,22 at a height such that the roller assembly 14 will be supported wherein the vehicle wheel will be supported approximately eighteen inches off the ground or from the supporting surface. Similarly, the vertical legs 20,22 and upper side beam 26 cooperate to operably support additional portions of the roller assembly 14.

The second side support frame 18 has two vertical legs 30,32. The vertical legs 30,32 may be considered a first vertical leg 30 and a second vertical leg 32 of the second side support frame 18, or a third vertical leg 30 and a fourth vertical leg 32 of the frame assembly 12. Thus, the frame assembly can be considered as having four vertical legs 20,22,30,32. The vertical legs 30,32 are connected by a lower side beam 34. The lower side beam 34 is connected to the vertical legs 30,32 at proximate a vertical midpoint of the height of the vertical legs 30,32. The vertical legs 30 are also connected by an upper side beam 36 proximate a vertical top of the vertical legs 30,32. The lower side beam 34 has a plurality notches 38 spaced and extending along the length of the lower side beam 34. The notches 38 are open at a top surface of the lower side beam 34 to receive the post of a roller to be described. In one exemplary embodiment, the plurality of notches 38 includes at least three notches 38 and in a further exemplary embodiment, there are five notches 38. As shown in FIG. 1, a centrally-located notch 38, or second central notch 38, is positioned proximate a midpoint of the length of the lower side beam 34. There are two notches 38 spaced apart on each side of the centrally-located notch 38. The lower side beam 34 and notches 38 will operably support portions of the roller assembly 14 as further described herein. Similarly, the vertical legs 30,32 and upper side beam 36 cooperate to operably support additional portions of the roller assembly 14. To this end, the frame assembly 12 has a plurality of extension supports 40 as well be described in greater below. As can be appreciated from FIG. 1, the respective notches 28,38 on the lower side beams 24,34 are generally aligned on locations along the lower side beams 24,34. Thus, the notches 38 of the second side support frame 18 are positioned in opposite corresponding locations generally to the notches 28 on the first side support frame 16. The spaced notches allow the rollers to be spaced at adjustable locations as will be described further below.

As further shown in FIGS. 1-5, the frame assembly 12 further has a first cross-beam 42 connected between the first side support frame 16 and the second side support frame 18 and at first ends of the first side support frame 16 and second side support frame 18. The frame assembly 12 further has a second cross-beam 44 connected between the first side support frame 16 and the second side support frame 18 and at second ends of the first side support frame 16 and second side support frame 18. As shown in FIG. 1, the first cross-beam 42 and the second cross-beam 44 are connected at vertical heights of the vertical legs 20,22,30,32 to generally correspond to the height of the lower side beams 24,34. Thus the first cross-beam 42 and second cross-beam 44 are generally aligned with the lower side beam 24 of the first side support frame 16 and the lower side beam 34 of the second side support frame 18. These connections heights can vary if desired.

It is understood that the various members of the frame assembly 12 are made of metal in an exemplary embodiment although other materials can be used. The members can be various types and sizes of angle iron members. The various connections can be made via welding, fasteners or other connection methods.

The frame assembly 12, thus formed, is a box-like structure having an open top. The area within the four vertical legs 20,22,30,32, or within the respective inner surfaces of the first side support frame 16 and second side support frame 18 and the first cross-beam 42 and the second cross-beam 44 defines a work area WA, or central area, that is dimensioned to be able to receive various types and sizes of vehicle wheels as will be described below. As shown schematically in FIG. 2, dotted lines extending from the respective inner surfaces show schematically the peripheral boundaries of the work area WA. As further to be described below, the rollers of the roller assemblies can be positioned within the work area WA. It is further understood that the work area A extends upwards from the lower side beams 24,34.

The benefits of the present invention, however, can be realized with other frame assemblies 12. Thus, it is understood that the frame assembly 12 can have different support structures that cooperate to support the roller assembly 14 and vehicle wheels. The frame assembly 12 has been disclosed and described in one exemplary embodiment as having the first side support frame 16, the second side support frame 18 as well the other members such as the cross-members. It is understood that the frame assembly 12 can take various other forms suitably constructed to rotatably support a vehicle wheel. The frame assembly 12 could have a cantilevered design, for example in having a single side support frame, or other configurations to suitably support the vehicle wheel.

It is also understood that bottom ends of the vertical legs 20,22,30,32 can be equipped with respective wheels (not shown) to allow the wheel stand 10 to be efficiently moved around a shop floor as needed. The wheels would have a locked position to maintain the wheel stand 10 in a stationary mode while an operator is preparing a vehicle wheel supported by the wheel stand 10.

FIGS. 1-6 further show the roller assembly 14. The roller assembly 14 is comprised of a plurality of different rollers that are paired and cooperate to assist in preparation of a vehicle wheel to be described. The rollers are similar in construction and free-spinning to rotatably support a vehicle wheel. The general structure of a representative roller is first described followed by a description of the rollers that make up the roller assembly 14.

Figure 6:
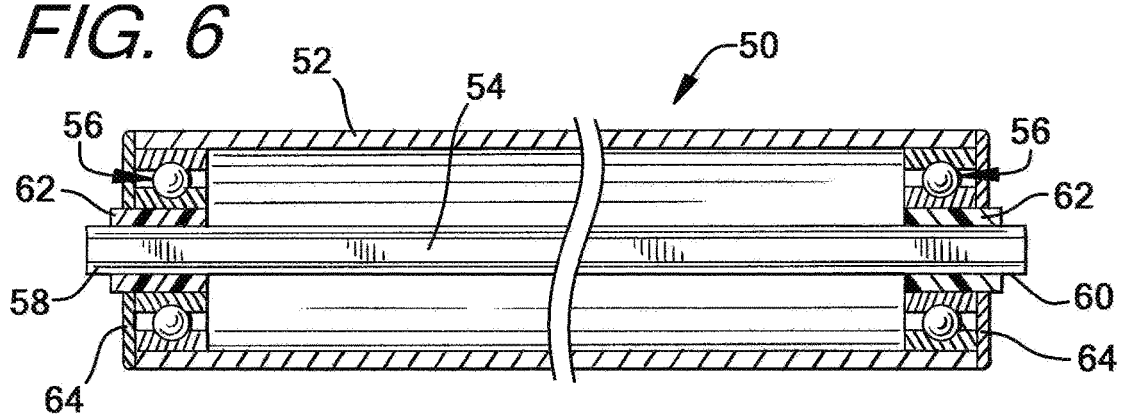
FIG. 6 is a schematic front cross-sectional view of a roller conveyor of a roller assembly used in the stand of the present invention.

The rollers are similar in construction to conveyor rollers, or bearing rollers, that are used in conveyor systems having a plurality of rollers positioned adjacent to one another wherein the roller rotates wherein boxes, packages or other items traverse on the rollers from one location to another location. FIG. 6 shows a representative roller, generally designated with the reference numeral 50. The roller 50 may include a cylindrical tube 52, an axle 54 and a bearing assembly 56 or bearing member 56. It is understood that FIG. 6 shows a schematic view of the roller 50 wherein additional components (not shown) may also be included with the roller 50. The cylindrical tube 52 has an annular tube surface that is generally smooth. The tube 52 is typically made from metal and may be a galvanized steel tube in one exemplary embodiment. The tube 52 could be made from other materials known in the art. The axle 54 is in the form of an elongated rod. The axle has a first post 58 at one end of the axle 54 and a second post 60 at an opposite end of the axle 54. The axle 54 is generally cylindrical and the posts 58,60 or post members 58,60 can be cylindrical or possess a squared or oblong shape to cooperate with the frame assembly 12 as described below. The bearing assembly 56 is positioned between an outer surface of the axle and an inner surface of the cylindrical tube 52. The bearing assembly 56 may be considered an internal bearing member. In an exemplary embodiment, the bearing assembly 56 includes a first bearing assembly 56 at one end of the cylindrical tube 52 and a second bearing assembly 56 at an opposite end of the cylindrical tube 52. Other components such as an axle adapter 62 and end cap 64 could also be provided. It is understood that the construction of the roller 50 allows the cylindrical tube 52 to spin freely in either rotational direction around the axle 52. Thus, the roller 50 can rotate in a clockwise direction or a counterclockwise direction. Thus, an object engaging the cylindrical tube 52 will rotate the tube 52 about the axle 54. It is further understood that the roller 50 can have various lengths wherein the lengths of the cylindrical tube 52 and axle 54 are determined accordingly (as shown schematically in FIG. 6). For example, the rollers can have different lengths depending on spacing of the support frames 16,18 or overall construction of the frame assembly 12 and where on the stand 10 the rollers are being employed.

The rollers 50 could have grease associated therewith to assist in smooth rotation or utilize other lubricants as desired.

The roller assembly 14 includes a plurality of rollers 50 including a first roller assembly 70 and a second roller assembly 72.

The first roller assembly 70 includes a first support roller 74 and a second support roller 76. The first roller assembly 70 is configured to span between the first side support frame 16 and the second side support frame 18 and being connected thereto, to support a vehicle wheel placed upon the wheel stand 10. Thus, the first support roller 74 is one of the rollers 50 previously described and has a length dimensioned to extend from the first side support frame 16 to the second side support frame 18. Thus, the first roller 74 extends between the first side support frame 16 that is spaced from the second side support frame 18. The respective posts 58,60 of the first support roller 74 cooperate with the lower side beams 24,34 of the side support frames 16,18. In particular, the respective posts 58,60 are received in the respective notches 28,38 of the lower side beams 24,34. The second support roller 76 is similarly positioned and operably connected between the first side support frame 16 and the second side support frame 18. The second roller 76 is spaced from the first roller 74. As described in greater detail below, the spacing of the first roller 74 from the second roller 76 can be varied and is thus adjustable. The adjustable feature of the rollers 74,76 allows the stand 10 to support vehicle wheels W of different diameter sizes.

The second roller assembly 72 also comprises a plurality of rollers 50. The second roller assembly 72 has a pair of spaced, lateral rollers, or a first lateral roller 78 and a second lateral roller 80. The first lateral roller 78 and the second lateral roller 80 are supported by the first side support frame 16. As shown in FIG. 1, the first lateral roller 78 is positioned proximate a first end of the upper side beam 26 of the first side support frame 16. A first extension support 40 is connected to a distal end of the first vertical leg 20. A second extension support 40 is connected to an inner surface of the upper side beam 26 of the first side support frame 16. The extension supports 40 have apertures therein. The respective first post 58 and second post 60 of the first lateral roller 78 are received by the apertures of the extension supports 40. Thus, the first lateral roller 78 is supported along the upper side beam 26 of the first side support frame 16. The second lateral roller 80 is positioned proximate a second end of the upper side beam 26 of the first side support frame 16. An extension support 40 is connected to a distal end of the second vertical leg 22. Another extension support 40 is connected to an inner surface of the upper side beam 26 of the first side support frame 16. The extension supports 40 have apertures therein. The respective first post 58 and second post 60 of the second lateral roller 80 are received by the apertures of the extension supports 40. Thus, the second lateral roller 80 is supported along the upper side beam 26 of the first side support frame 16. As further shown in FIG. 1, the first lateral roller 78 is spaced from the second lateral roller 80 wherein a gap G is defined between the lateral rollers 78,80. The gap G is positioned proximate a central portion or central segment of the upper side beam 26 of the first side support frame 16. Rather than an extension support, it can be considered that the lateral rollers are connected to extended, integral portions of distal ends of the first vertical leg 20 and second vertical leg 22. As discussed, the vertical legs 20,22 and extension supports 40 may be angle iron members in an exemplary embodiment. With such configuration and connections, the first lateral roller 78 and the second lateral roller 80 are positioned adjacent and inward of a vertical plane defined by the first side support frame 16. Explained differently, the first lateral roller 78 and the second lateral roller 80 are positioned within the work area WA defined by the frame assembly 12.

In an exemplary embodiment, the wheel stand 10 has a second roller assembly 72 having a first pair of spaced, lateral rollers 78,80 as discussed above. In a further exemplary embodiment, the second roller assembly 72 comprises a first pair of spaced, lateral rollers 78,80 and also a second pair of spaced, lateral rollers. As further shown in FIG. 1, the second roller assembly 72 has a second pair of spaced, lateral rollers, or a third lateral roller 82 and a fourth lateral roller 84. The third lateral roller 82 and the fourth lateral roller 84 are supported by the second side support frame 18. As shown in FIG. 1, the third lateral roller 82 is positioned proximate a first end of the upper side beam 36 of the second side support frame 18. An extension support 40 is connected to a distal end of the third vertical leg 30. Another extension support 40 is connected to an inner surface of the upper side beam 36 of the second side support frame 18. The extension supports 40 have apertures therein. The respective first post 58 and second post 60 of the third lateral roller 82 are received by the apertures of the extension supports 40. Thus, the third lateral roller 82 is supported along the upper side beam 36 of the second side support frame 18. The fourth lateral roller 80 is positioned proximate a second end of the upper side beam 36 of the second side support frame 18. An extension support 40 is connected to a distal end of the fourth vertical leg 32. Another extension support 40 is connected to an inner surface of the upper side beam 36 of the first side support frame 18. The extension supports 40 have apertures therein. The respective first post 58 and second post 60 of the fourth lateral roller 80 are received by the apertures of the extension supports 40. Thus, the fourth lateral roller 80 is supported along the upper side beam 36 of the second side support frame 18. As further shown in FIG. 1, the third lateral roller 82 is spaced from the fourth lateral roller 84 wherein a gap G is defined between the lateral rollers 82,84. The gap G is positioned proximate a central portion or central segment of the upper side beam 36 of the second side support frame 18. Rather than an extension support, it can be considered that the lateral rollers are connected to extended, integral portions of distal ends of the third vertical leg 30 and fourth vertical leg 32. As discussed, the vertical legs 30,32 and extension supports 40 may be angle iron members in an exemplary embodiment. With such configuration and connections, the third lateral roller 82 and the fourth lateral roller 84 are positioned adjacent and inward of a vertical plane defined by the second side support frame 18. Explained differently, the third lateral roller 82 and the fourth lateral roller 84 are positioned within the work area WA defined by the frame assembly 12. It is further understood that the apertures associated with the extension supports may be open to a peripheral surface to accommodate receiving the posts on the roller.

As can be further appreciated from FIG. 1, the first pair of spaced, lateral rollers 78,80 and second pair of spaced, lateral rollers 82,84 are connected and positioned generally opposite one another. Thus, the first lateral roller 78 is positioned across from the third lateral roller 82 and the second lateral roller 80 is positioned across from the fourth lateral roller 84. In an exemplary embodiment, the rollers 50 of the second roller assembly 72 are equal in length and the gaps G between the first pair of lateral rollers 78,80 and the second pair of lateral rollers 82,84 are equal. As can be further appreciated from FIGS. 1 and 5, the upper side beams 26,36 can have additional support apertures to position the extension supports 40 at different locations on the upper side beams 26,36 wherein lateral rollers of different lengths or sizes can be utilized. Arrows shown in FIG. 5 indicated the adjustable configuration. It is further understood that the heights of the lateral rollers 78-84 can be varied depending on the structures of the extension supports 40.

As shown in FIGS. 1-6, the first support roller 74 is placed on the wheel stand 10 and operably connected to the first side support frame 16 and the second side support frame 18. The first post 58 of the first support roller 74 is received by one of the notches 28 on the lower side beam 26 of the first side support frame 16, and the second post 60 of the first support roller 74 is received by the corresponding notch 38 on the lower side beam 34 of the second side support frame 18 (aligned notches 28,38). Similarly, the first post 58 of the second support roller 76 is received by one of the notches 28 on the lower side beam 26 of the first side support frame 16, and the second post 60 of the second support roller 76 is received by the corresponding notch 38 on the lower side beam 36 of the second side support frame 18 (aligned notches 26,38). In this configuration, the second support roller 76 is spaced from the first support roller 74. As the respective lower side beams 26,36 have the plurality of notches 28,38, the spacing between the first support roller 74 and the second support roller 76 can be varied and adjusted as required by the operator in preparing differently sized vehicle wheels as explained in greater detail below. The rollers of the second roller assembly 72 are connected and supported along the first side support frame 16 and the second side support frame 18. It is further appreciated that the first support roller 76 and the second support roller 78 are parallel to one another and are generally transverse or perpendicular to the spaced, lateral rollers 78-84. It is understood that the various rollers of the roller assembly 14 are free-wheeling rollers that can rotate in a forward or reverse direction or clockwise or counterclockwise directions. The rollers are non-powered rollers and are not driven by other powered or mechanically driven means. The rollers rotatably support the vehicle wheel and rotate when the vehicle wheel is manually rotated as described below.

FIGS. 7-12 show operation of the vehicle wheel buffing stand 10. The vehicle wheel buffing stand 10 is typically used in a tire shop or assembly plant, but can also be used in other environments where tires are mounted on vehicle wheels such as mechanics shops or other maintenance environments.

Figure 7:
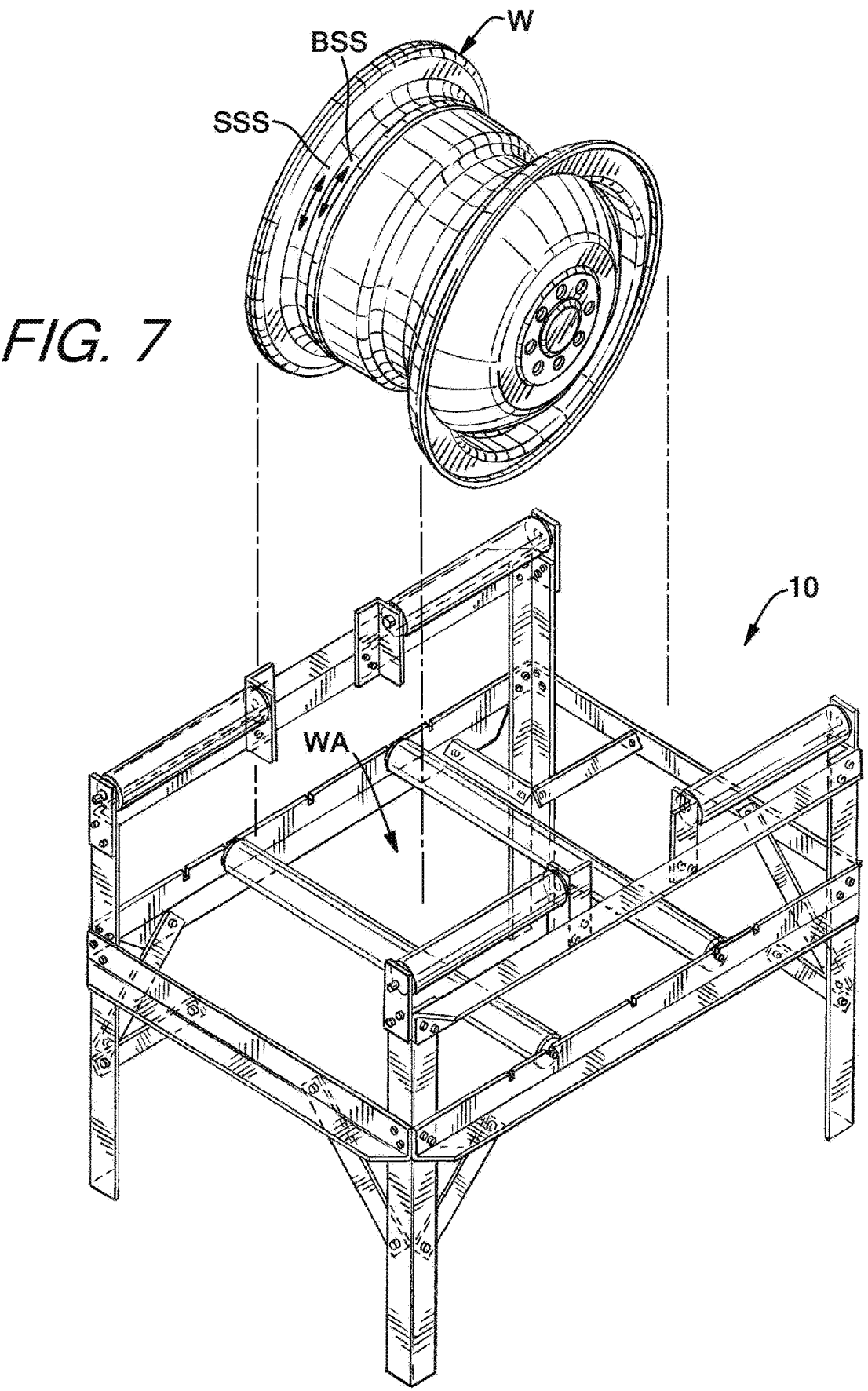
FIG. 7 is a perspective exploded view of the vehicle wheel buffing stand and a vehicle wheel to be supported by the stand.
Figure 8:
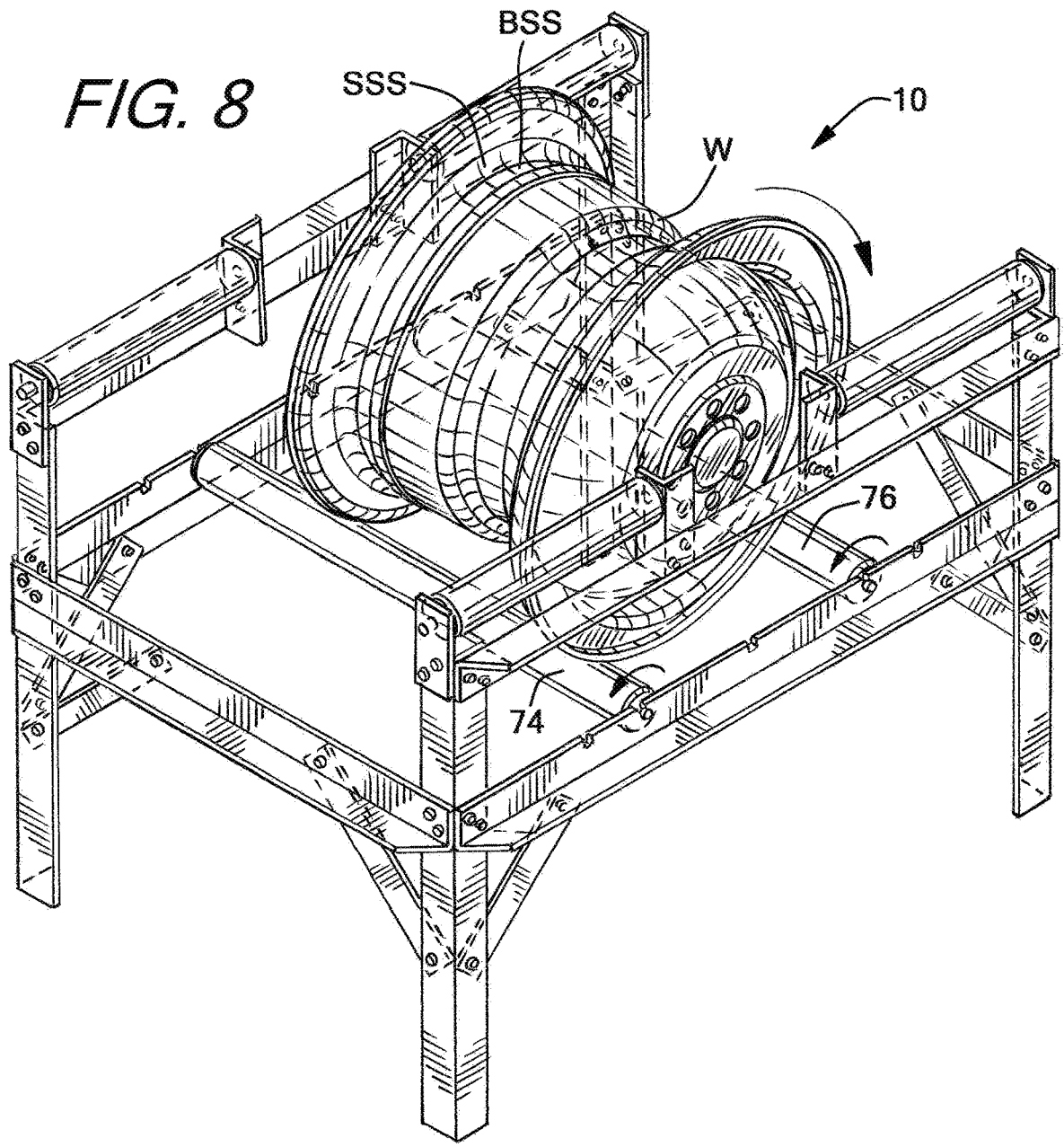
FIG. 8 is a perspective view of the vehicle wheel buffing stand supporting the vehicle wheel.
Figure 9:
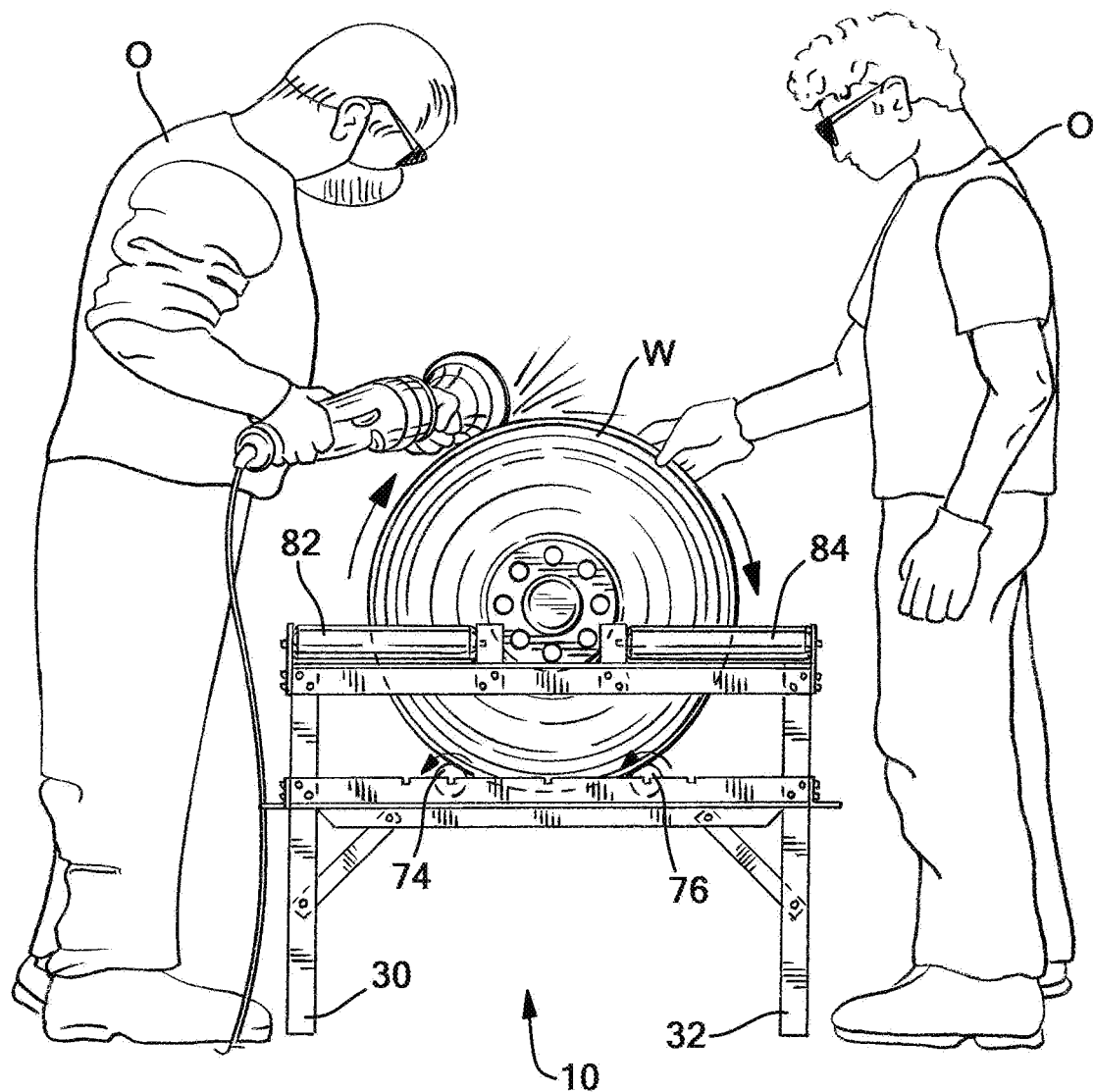
FIG. 9 is a schematic view of operators preparing and buffing the vehicle wheel supported by the vehicle wheel buffing stand.
Figure 10:
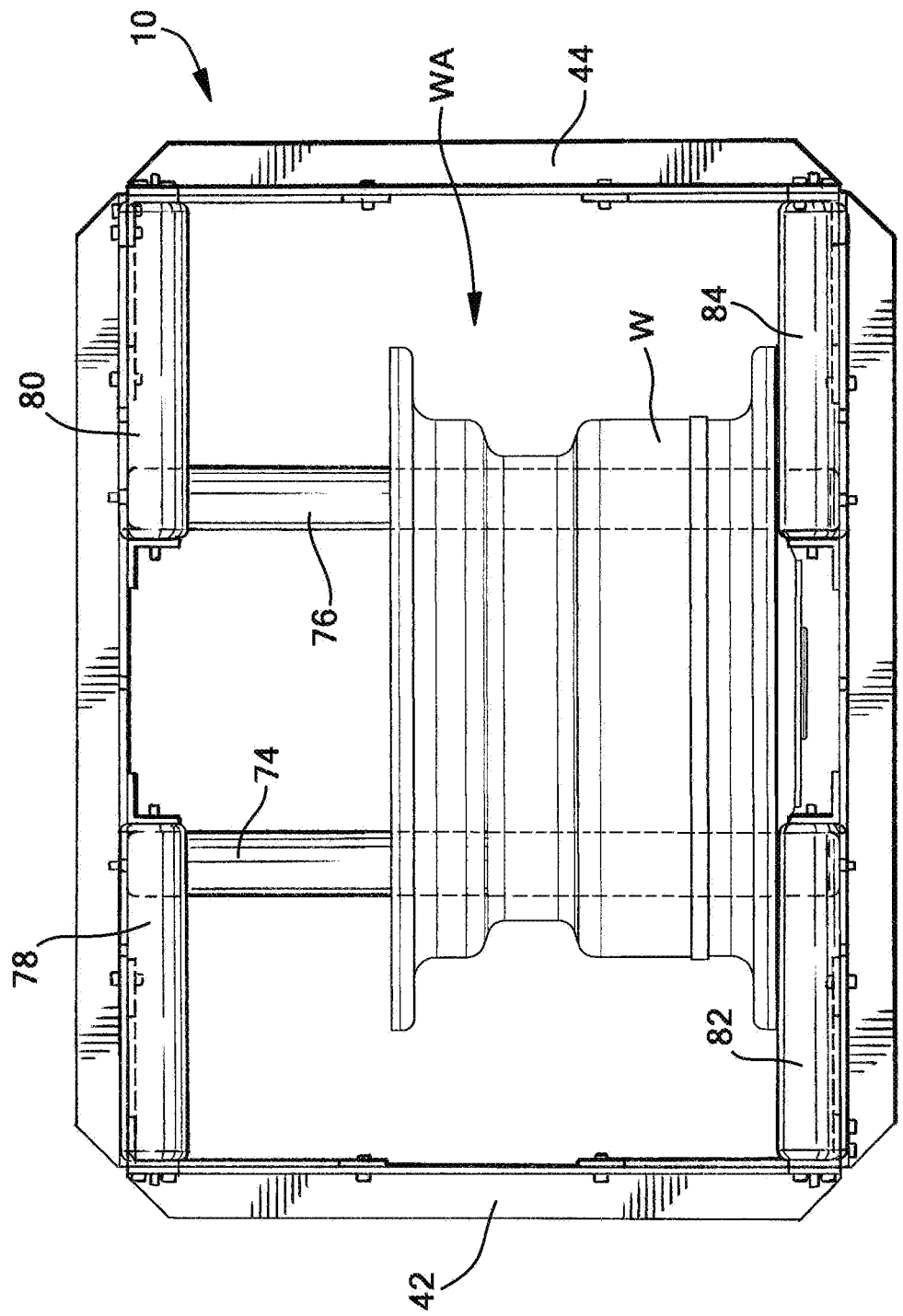
FIG. 10 is a top plan view of the vehicle wheel buffing stand supporting the vehicle wheel.
Figure 11:
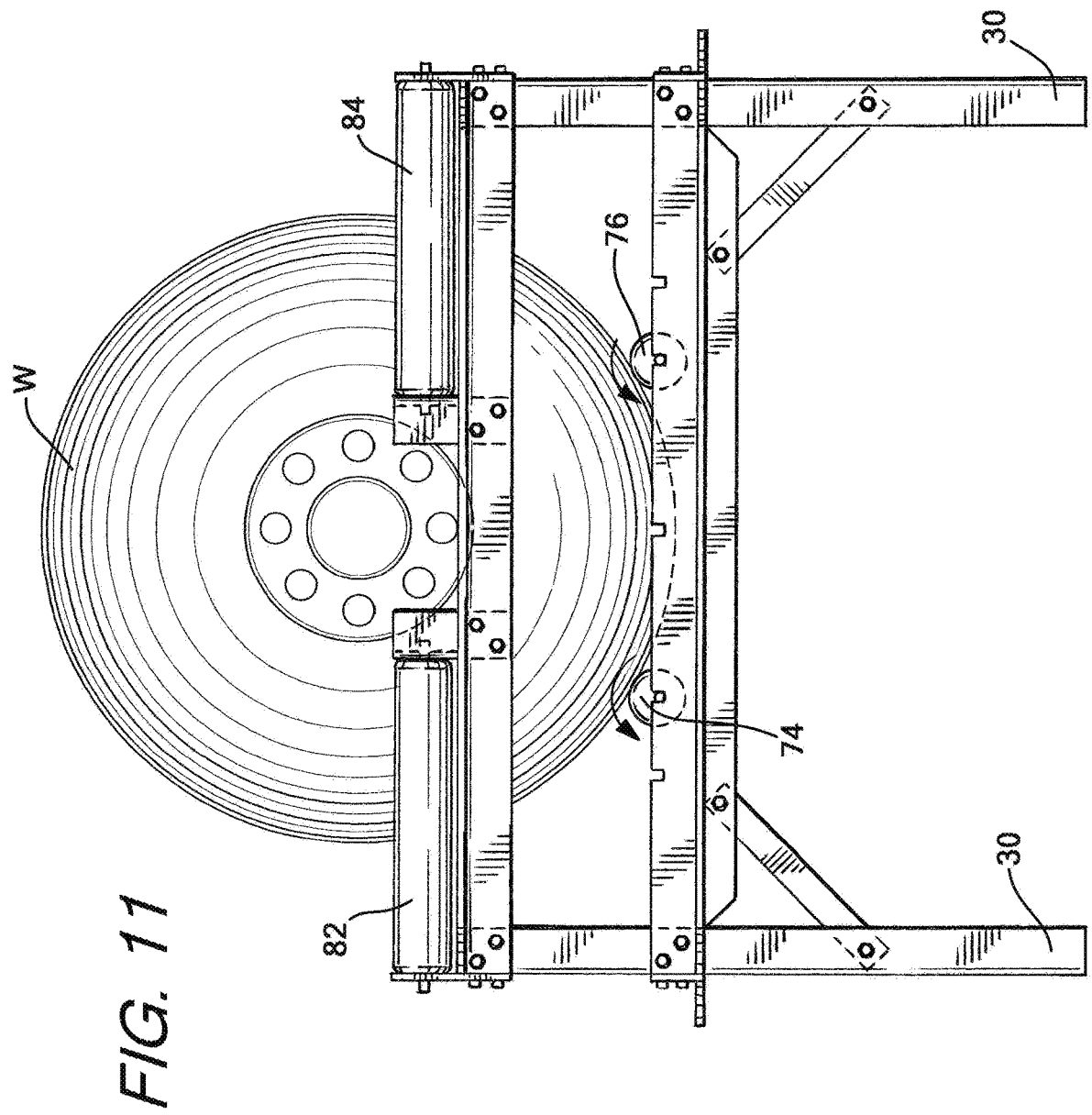
FIG. 11 is a side elevation view of the vehicle wheel buffing stand supporting the vehicle wheel.
Figure 12:
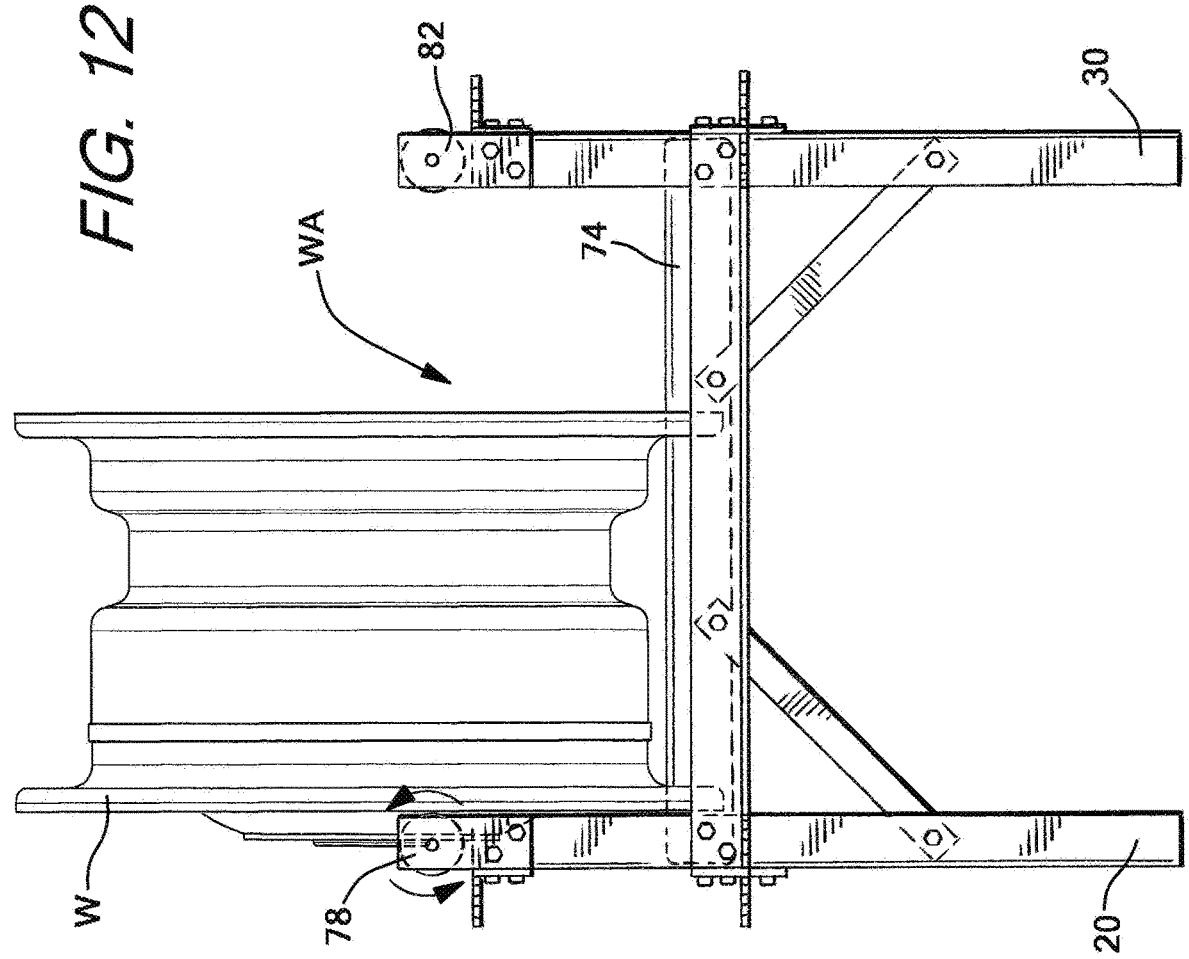
FIG. 12 is an end elevation view of the vehicle wheel buffing stand supporting the vehicle wheel.

In an exemplary embodiment, the first support roller 74 and the second support roller 76 are placed in the respective notches 28,38 immediately adjacent to the centrally positioned notch. This position of the rollers 74,76 is set for one particular size of vehicle wheel W. The operator places the vehicle wheel W to be prepared onto the wheel stand 10 wherein the stand 10 receives the wheel W in the work area WA. To this end, the outer annular surfaces of the wheel W are placed onto the first support roller 74 and the second support roller 76 wherein the wheel W is rotatably supported by and engaged by the rollers 74,76 (FIGS. 7-8). As shown in FIG. 9, the operator O uses different tools such as grinding wheels or sanders to prepare surfaces of the wheel W in preparation for mounting a tire on the vehicle wheel W. The operator O may push the wheel W to rotate the wheel W wherein the wheel W rotates on the supporting rollers 74,76 and while using the tools to prepare the surfaces of the wheel W. Another operator can assist if necessary such as by rotating the wheel W while the other operator prepares the surfaces. It is understood that the operator can rotate the wheel in either a clockwise direction or a counterclockwise direction. The operator prepares surfaces of the wheel W such as by removing areas of oxidation from the wheel W. To make sure the entire surfaces are properly prepared around a full circular periphery of the wheel W, the operator manually rotates with wheel W. The wheel W engages the rollers 74,76, and as the rollers 74,76 are free-spinning, the rollers 74,76 rotate as well. Thus, it may be considered that the operator rotates the wheel W via rotation of the rollers 74,76 as the rollers 74,76 rotate upon rotation of the wheel W. The ability to rotate the wheel W allows the operator to efficiently prepare the wheel surfaces. The operator may also apply lubrication to the wheel W while rotating the wheel W on the rollers 74,76. As the wheel W rotates on the support rollers 74,76, the wheel W may traverse along the length of the support rollers 74,76 towards either the first side support frame 16 or the second side support frame 18. If towards the first side support frame 16, the wheel W engages the first lateral roller 78 and the second lateral roller 80. The lateral rollers 74,76 assist in stabilizing the wheel W on the stand 10 and provide a stop while the operator prepares the surfaces of the wheel W. Because the wheel W is rotating in one direction, it is understood that when engaged by the rotating wheel W, the first lateral roller 78 and the second lateral roller 80 will rotate in opposite directions from one another. Thus, one lateral roller will rotate in one direction and the other lateral roller will rotate in an opposite direction. If the wheel W traverses towards the second side support frame 18, the wheel W engages the third lateral roller 82 and the fourth lateral roller 84. Because the wheel W is rotating in one direction, it is also understood than when engaged by the rotating wheel W, the third lateral roller 82 and the fourth lateral roller 84 will rotate in opposite directions from one another. FIG. 7 shows in greater detail the surfaces on the vehicle wheel W that the operator prepares. While the operator can efficiently prepare and polish the various surfaces of the wheel W, a bottom seal surface BSS is prepared as well as a side seal surface SSS. These surfaces cooperate with portions of a tire that is operably connected to the vehicle wheel W as in known in the art. It is understood that the bottom seal surface BSS and the side seal surface SSS can be prepared around a full periphery of the wheel W. It is understood that these locations are prepared on each side of the vehicle wheel W. These steps performed by the operator(s) assist in preparing the vehicle wheel W for mounting a tire on the vehicle wheel.

Figure 13:
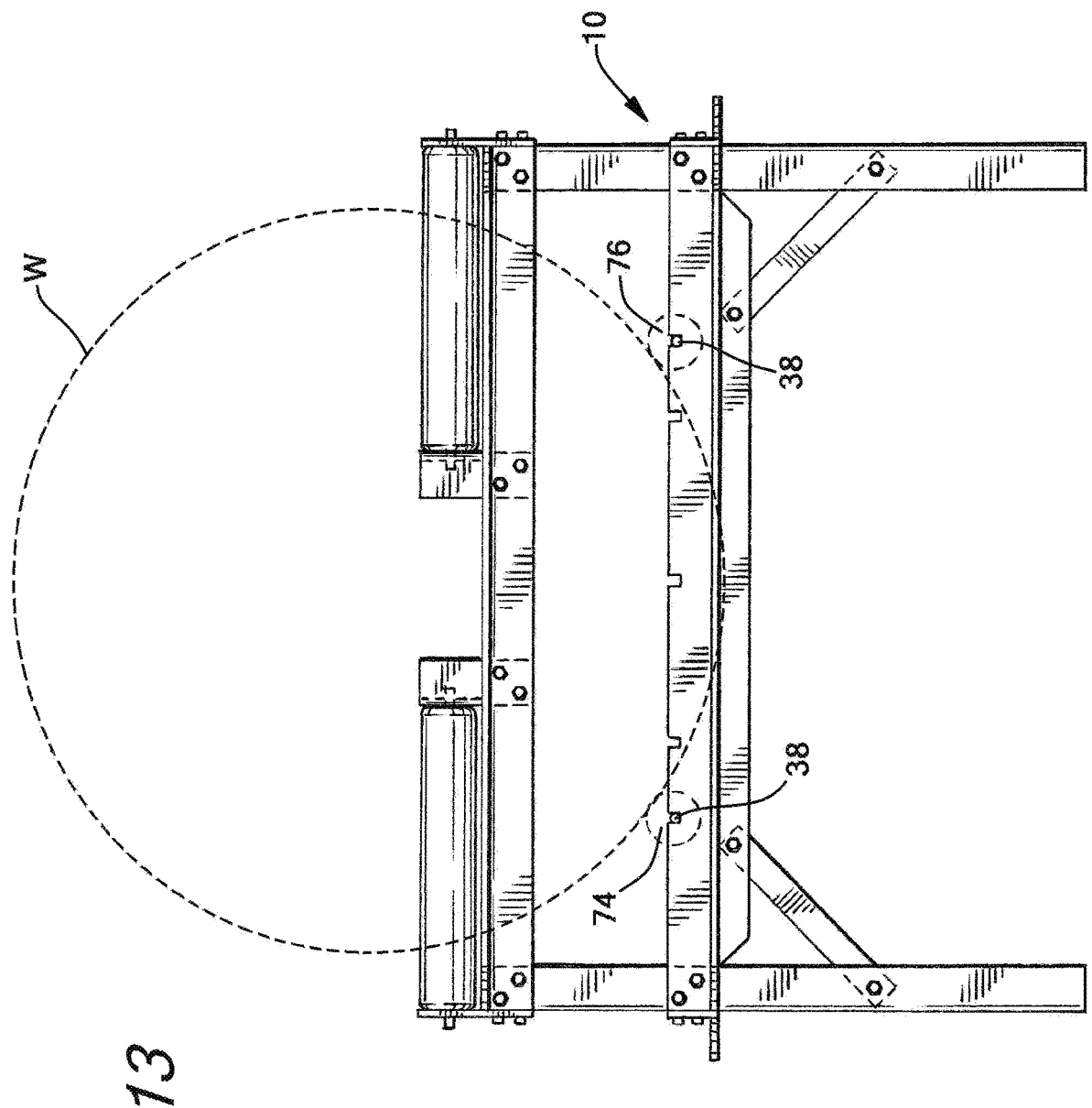
FIG. 13 is a side elevation view of the vehicle wheel buffing stand with a roller assembly positioned in an alternative configuration to support a larger vehicle wheel shown in phantom lines.

As further shown in FIGS. 8, 9, 11 and 13, a bottom peripheral surface of the vehicle wheel W is positioned below top surfaces of the rollers 74,76 when the vehicle wheel W is rotatably supported by the rollers 74,76. The bottom periphery of the wheel W is below the contact points of the wheel W on the rollers 74,76. This configuration assists in lowering the center of gravity of the wheel to provide an enhanced stable support for the vehicle wheel W. This assists in minimizing the chance of the vehicle wheel W conveying over or "jumping" over one of the rollers 74,76 and to maintain the wheel W between the rollers 74,76. Because of the plurality of notches 28,38 on the lower side beams 26,36, the spacing between the first support roller 74 and the second support roller 76 can vary. This configuration is useful for accommodating vehicle wheel of different sizes. A larger spacing between the support rollers 74,76 will provide a more stable and efficient support for a larger vehicle wheel W such as a truck wheel. FIG. 13 discloses a configuration wherein the rollers 74,76 are further spaced apart to receive a vehicle wheel W of a larger size. In an another example which can be appreciated from FIG. 3, one of the first and second support rollers 74,76 can be positioned in the centrally-located notches 28,38 and the other of the first and second support rollers 74,76 can be positioned in the notch 28,38 furthest from the centrally-located notches 28,38. Such configuration is useful for preparing surfaces of a smaller vehicle wheel W such for a smaller passenger car. It is understood that the vehicle wheel W can have varying sizes including a 20 inch wheel, a 22 inch wheel or a 24 inch wheel. Other sizes can also be accommodated by the stand 10. The width of the wheel W can also vary such as up to 18 inch widths.

It is understood that the wheel stand 10 can have other alternative configurations. For example, the frame assembly 12 could have a lesser number of support legs or more complex structure. While conveyor rollers are used in an exemplary embodiment having constant diameters, pitched rollers, or tapered rollers could also be used where a roller diameter varies along the length of the roller.

The vehicle wheel stand assembly 10 of the present invention provides several benefits. The vehicle wheel buffing stand 10 supports the vehicle wheel W in the work area WA at a comfortable height for an operator(s) standing adjacent the stand 10. As discussed, the stand 10 supports the vehicle wheel W at approximately 18 inches from the floor or support surface. The inventor has determined that such height provides for a comfortable working posture when preparing the surfaces of the vehicle wheel W. The wheel stand 10 allows the operator to rotate the wheel W to more efficiently prepare and buff the surfaces of the wheel W in preparation for mounting a tire thereon. Thus, the bottom seal surfaces and side seal surfaces can be buffed, polished or otherwise prepared around a fully periphery of the wheel W. The surfaces are prepared while off of the ground that can contribute to contaminating the surfaces to be prepared. Because the surfaces of the wheel W are cleaner using the wheel stand 10, lubricants and sealants applied to the wheel surfaces will adhere better to the tire mounted on the wheel W. Thus, better seals are achieved between the vehicle wheel W and the tire. The operator can also prepare and buff all four surfaces of the vehicle wheel W. The surfaces of the wheel W can be prepared by the operator while the operator is generally stationary on a floor of a work area. In addition, the vehicle wheel buffing stand is not an automated device wherein rollers are powered to rotate to then rotate the vehicle wheel. This simplifies the design allowing for a more efficient and economically friendly design. Such design further allows an operator to prepare the surfaces which typically achieves better results than efforts to fully automate such processes.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A vehicle wheel buffing stand comprising:
    a first side support frame;
    a second side support frame spaced from the first side support frame;
    a first roller extending between the first side support frame and the second side support frame, the first roller being operably connected to the first side support frame and the second side support frame;
    a second roller extending between the first side support frame and the second side support frame, the second roller being operably connected to the first side support frame and the second side support frame, the second roller being spaced from the first roller,
    wherein the first roller and the second roller are supported on the first side support frame and the second side support frame a same distance from a supporting surface supporting the first side support frame and the second side support frame,
    a first pair of spaced, lateral rollers supported along the first side support frame, and a second pair of spaced, lateral rollers supported along the second side support frame,
    wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel.

2. The vehicle wheel buffing stand of claim 1 wherein the first side support frame has at least three notches and the second side support frame has at least three notches wherein the first roller has opposite ends that fit in a first set of aligned notches of the first side support frame and the second side support frame, the second roller having opposite ends that fit in a second set of aligned notches of the first side support frame and the second side support frame, the space between the first roller and the second roller being adjustable based on the sets of aligned notches where the first roller and the second roller are positioned.

3. The vehicle wheel buffing stand of claim 2 wherein the first side support frame has five notches spaced along the first side support frame and the second side support frame has five notches spaced along the second side support frame.

4. The vehicle wheel buffing stand of claim 1 wherein in response to rotation of the vehicle wheel on the first roller and second roller and lateral movement of the vehicle wheel along the first roller and the second roller, the first pair of spaced, lateral rollers are configured to engage the vehicle wheel wherein one roller of the first pair of lateral rollers rotates in a direction opposite to an other roller of the first pair of lateral rollers.

5. The vehicle wheel buffing stand of claim 1 wherein in response to rotation of the vehicle wheel on the first roller and second roller and lateral movement of the vehicle wheel along the first roller and the second roller, the second pair of spaced, lateral rollers are configured to engage the vehicle wheel wherein one roller of the second pair of lateral rollers rotates in a direction opposite to an other roller of the second pair of lateral rollers.

6. The vehicle wheel buffing stand of claim 1 wherein the first roller and the second roller extend generally transverse to the first pair of spaced, lateral rollers.

7. The vehicle wheel buffing stand of claim 1 wherein the first pair of lateral rollers are spaced at a central segment of the first side support frame, and the second pair of lateral rollers are spaced at a central segment of the second side support frame.

8. The vehicle wheel buffing stand of claim 1 wherein the first roller has a roller member surrounding internal bearing members and post members at opposite ends of the roller member wherein the post members engage the first side support frame and the second side support frame.

9. The vehicle wheel buffing stand of claim 1 wherein the first side support frame has two vertical legs connected by a lower side beam and an upper side beam, the lower side beam having at least five notches, the notches spaced along the lower side beam, and wherein the second side support frame has two vertical legs connected by a lower side beam and an upper side beam, the lower side beam having at least five notches, the notches spaced along the lower side beam, and wherein a first cross-beam is connected between the first side support frame and the second side support frame and at first ends of the first side support frame and the second side support frame, and a second cross-beam is connected between the first side support frame and the second side support frame and at second ends of the first side support frame and second side support frame.

10. The vehicle wheel buffing stand of claim 9 wherein the first roller has opposite ends that fit in a first set of aligned notches of the first side support frame and the second side support frame, and the second roller has opposite ends that fit in a second set of aligned notches of the first side support frame and the second side support frame.

11. The vehicle wheel buffing stand of claim 10 further comprising a first pair of spaced, lateral rollers supported along the upper side beam of the first side support frame.

12. The vehicle wheel buffing stand of claim 11 further comprising a second pair of spaced, lateral rollers supported along the upper side beam of the second side support frame.

13. The vehicle wheel buffing stand of claim 3 wherein the five notches on the first side support frame includes a first central notch positioned proximate a midpoint of a length of the first side support frame and further includes two notches on each side of the first central notch and spaced along the first side support frame, and wherein the five notches on the second side support frame includes a second central notch positioned proximate a midpoint of a length of the second side support frame and further includes two notches on each side of the second central notch and spaced along the second side support frame.

14. The vehicle wheel buffing stand of claim 9 wherein the first cross-beam and second cross-beam are generally aligned with the lower side beam of the first side support frame and the lower side beam of the second side support frame.

15. The vehicle wheel buffing stand of claim 1 wherein the space between respective inner surfaces of the first side support frame and the second side support frame defines a work area wherein the first spaced pair of lateral rollers are positioned within the work area.

16. The vehicle wheel buffing stand of claim 1 wherein the first roller and the second roller are non-powered rollers and free-spinning.

17. A vehicle wheel buffing stand comprising:
a first side support frame;
a second side support frame spaced from the first side support frame;
a first roller assembly having a first roller extending between the first side support frame and the second side support frame, the first roller being operably connected to the first side support frame and the second side support frame, and a second roller extending between the first side support frame and the second side support frame, the second roller being operably connected to the first side support frame and the second side support frame, the second roller being spaced from the first roller; and
a second roller assembly having a first pair of spaced, lateral rollers supported along the first side support frame wherein the first pair of spaced, lateral rollers are permanently aligned with the first side support frame,
wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel, and wherein in response to lateral movement of the vehicle wheel along the first roller and the second roller, the first pair of spaced, lateral rollers are configured to engage the vehicle wheel wherein one roller of the first pair of lateral rollers rotates in a direction opposite to an other roller of the first pair of lateral rollers.

18. The vehicle wheel buffing stand of claim 1 wherein the first side support frame has two vertical legs, each vertical leg extending along a straight vertical axis from a respective end of the vertical leg configured to be positioned on a supporting surface and an opposite respective end proximate the first pair of spaced, lateral rollers.

19. The vehicle wheel buffing stand of claim 1 wherein the first roller comprises a cylindrical tube having a length extending between a first end and a second end wherein the tube has generally a constant diameter along the length of the tube.

20. The vehicle wheel buffing stand of claim 1 wherein the first side support frame has two vertical legs and further comprising a lateral roller supported by the first side support frame at one of the vertical legs wherein the vehicle wheel is configured to freely move laterally along the first roller and the second roller without engaging the lateral roller.

21. A vehicle wheel buffing stand comprising:
a first side support frame;
a second side support frame spaced from the first side support frame;
a first roller extending between the first side support frame and the second side support frame, the first roller being operably connected to the first side support frame and the second side support frame;
a second roller extending between the first side support frame and the second side support frame, the second roller being operably connected to the first side support frame and the second side support frame, the second roller being spaced from the first roller,
wherein the first side support frame has at least three notches and the second side support frame has at least three notches wherein the first roller has opposite ends that fit in a first set of aligned notches of the first side support frame and the second side support frame, the second roller having opposite ends that fit in a second set of aligned notches of the first side support frame and the second side support frame, the space between the first roller and the second roller being adjustable based on the sets of aligned notches where the first roller and the second roller are positioned,
wherein the first roller and the second roller are supported on the first side support frame and the second side support frame a same distance from a supporting surface supporting the first side support frame and the second side support frame,
wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel.

22. A vehicle wheel buffing stand comprising:
a first side support frame;
a second side support frame spaced from the first side support frame;
a first roller extending between the first side support frame and the second side support frame, the first roller being operably connected to the first side support frame and the second side support frame;
a second roller extending between the first side support frame and the second side support frame, the second roller being operably connected to the first side support frame and the second side support frame, the second roller being spaced from the first roller,
wherein the first roller and the second roller are supported on the first side support frame and the second side support frame a same distance from a supporting surface supporting the first side support frame and the second side support frame,
a first pair of spaced, lateral rollers supported along the first side support frame, wherein the first roller and the second roller extend generally transverse to the first pair of spaced, lateral rollers,
wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel.

23. A vehicle wheel buffing stand comprising:
a first side support frame;
a second side support frame spaced from the first side support frame,
wherein the first side support frame has two vertical legs connected by a lower side beam and an upper side beam, the lower side beam having at least five notches, the notches spaced along the lower side beam, and wherein the second side support frame has two vertical legs connected by a lower side beam and an upper side beam, the lower side beam having at least five notches, the notches spaced along the lower side beam, and wherein a first cross-beam is connected between the first side support frame and the second side support frame and at first ends of the first side support frame and the second side support frame, and a second cross-beam is connected between the first side support frame and the second side support frame and at second ends of the first side support frame and second side support frame;
a first roller extending between the first side support frame and the second side support frame, the first roller being operably connected to the first side support frame and the second side support frame;
a second roller extending between the first side support frame and the second side support frame, the second roller being operably connected to the first side support frame and the second side support frame, the second roller being spaced from the first roller,
wherein the first roller and the second roller are supported on the first side support frame and the second side support frame a same distance from a supporting surface supporting the first side support frame and the second side support frame,
wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel.

24. A vehicle wheel buffing stand comprising:
a first side support frame;
a second side support frame spaced from the first side support frame;
a first roller extending between the first side support frame and the second side support frame, the first roller being operably connected to the first side support frame and the second side support frame;
a second roller extending between the first side support frame and the second side support frame, the second roller being operably connected to the first side support frame and the second side support frame, the second roller being spaced from the first roller,
wherein the first roller and the second roller are supported on the first side support frame and the second side support frame a same distance from a supporting surface supporting the first side support frame and the second side support frame,
wherein the stand is configured to receive a vehicle wheel wherein the first roller and the second roller are configured to engage the vehicle wheel and rotatably support the vehicle wheel wherein an operator can rotate the vehicle wheel on the first roller and the second roller and to prepare surfaces of the vehicle wheel in preparation for mounting a tire on the vehicle wheel, wherein the first side support frame has two vertical legs and further comprising a lateral roller supported by the first side support frame at one of the vertical legs wherein the vehicle wheel is configured to freely move laterally along the first roller and the second roller without engaging the lateral roller.

* * * * *